United States Patent [19]

Burns

[11] Patent Number: 4,567,557
[45] Date of Patent: Jan. 28, 1986

[54] BUILDING INTELLIGENCE SYSTEM

[76] Inventor: Martin J. Burns, 30-4 Farm Rd., Somerville, N.J. 08876

[21] Appl. No.: 469,122

[22] Filed: Feb. 23, 1983

[51] Int. Cl.[4] ............................................. G06F 15/56
[52] U.S. Cl. .............................. 364/145; 340/310 A; 340/825.06; 364/138; 364/493
[58] Field of Search ................................ 364/140–147, 364/492, 493, 418, 505, 557, 138; 340/310 R, 310 A, 825.06, 825.07, 825.22, 825.52; 307/38–41

[56] References Cited

U.S. PATENT DOCUMENTS

| | | | |
|---|---|---|---|
| 4,153,936 | 5/1979 | Schmitz et al. | 364/145 X |
| 4,173,754 | 11/1979 | Feiker | 364/505 X |
| 4,213,182 | 7/1980 | Eichelberger et al. | 364/145 X |
| 4,217,646 | 8/1980 | Caltagirone et al. | 364/505 X |
| 4,429,299 | 1/1984 | Kabat et al. | 340/310 A X |

Primary Examiner—Joseph Ruggiero
Attorney, Agent, or Firm—Steele, Gould & Fried

[57] ABSTRACT

A building intelligence system is disclosed that is compact in construction and includes a single cabinet within which all of the operating components are housed. The system incorporates an uninterruptible power supply, a hard-wired input board, a relay output board and a power-line carrier transmitter output. A dedicated computer is programmable through a computer interface to provide a wide range of control to such functions as energy systems, security systems, appliances, lights and other electrical electro-mechanical systems that are present within the building.

11 Claims, 11 Drawing Figures

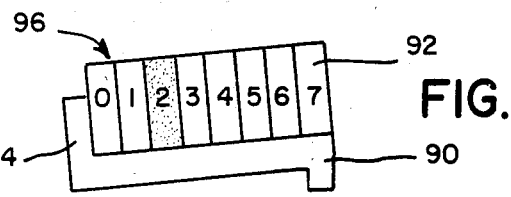
FIG. 7
FIG. 8
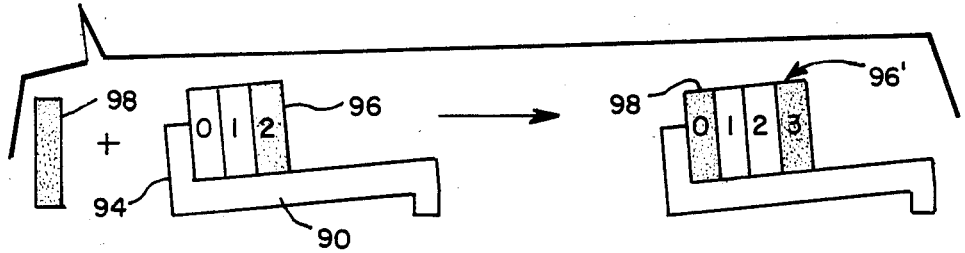
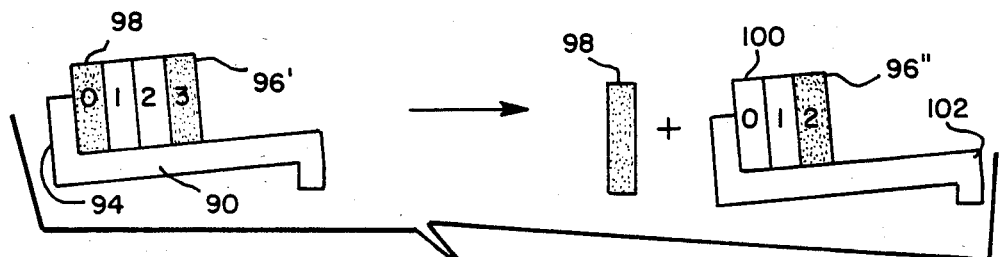
FIG. 9
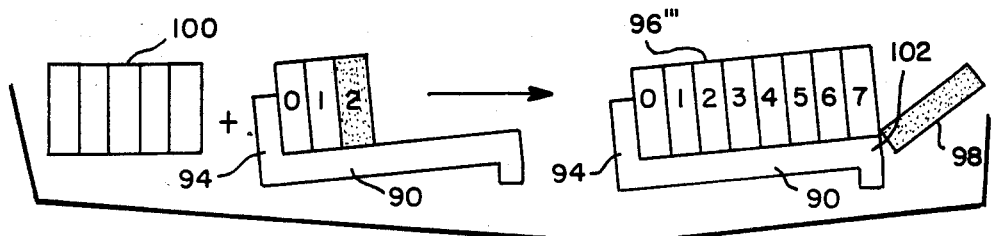
FIG. 10
FIG. 11
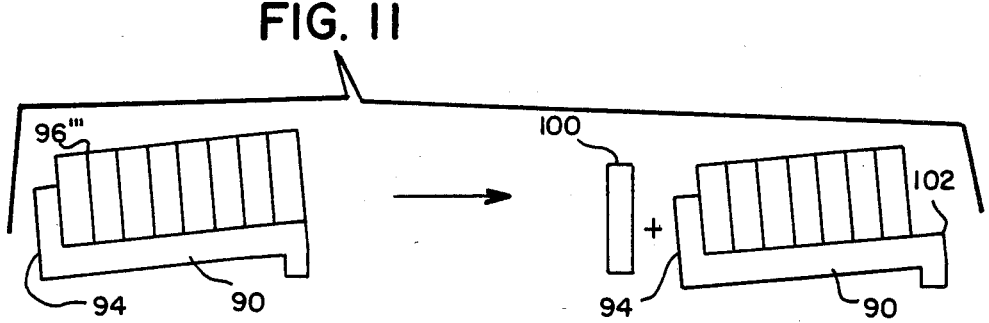

BUILDING INTELLIGENCE SYSTEM

FIELD OF INVENTION

The present invention relates generally to the field of control systems, and more particularly, is directed to a compact computer controlled system that is provided with the capability of monitoring and automatically controlling most electrical and mechanical functions that are normally installed in and about a home or other building.

BACKGROUND OF THE INVENTION

It is the usual practice in and about homes and other structures to provide various electrical, mechanical and electro-mechanical systems either at the time of original construction or at some future time whenever desired or required by the occupants of the building. Such systems typically can include lighting systems, heating systems, air conditioners, smoke detectors, heat detectors, burglar alarms, and the like. Most of the installed systems are individually controlled and monitored and such systems have to be individually, manually adjusted by the building owner or occupants to meet existing or changing conditions of use.

In the case of lighting systems, it is known to provide individual dimmer controls, to provide timed lighting sequences, to provide devices capable of monitoring energy consumption, and the like. With regard to typical burglar alarm systems and fire alarm systems, it is known to include stand-by batteries for function in the event of current failure, to provide continuous circuit monitoring to detect short circuits or open wires, and to include automatic transmitting devices to summon local fire and police departments upon the occurrence of a predetermined event. Automatic controls for air conditioners, heaters and fans are also known and most commonly employed controls can be readily purchased and installed whenever so desired.

However, the ability to automatically control substantially each and every mechanical and electrical system installed in a building from a single location in an easily adjustable or programmable manner by utilizing a single system control device is not presently possible and cannot be accomplished when utilizing the known types of system control apparatus as is currently available.

SUMMARY OF THE INVENTION

The present invention relates generally to an automatic control system, and more particularly, is directed to an intelligence system adapted to be installed in a building such as a home to provide the capability of automatically controlling various functions that are normally present within and about the building.

The building intelligence system of the present invention includes generally a central panel of relatively small dimensions that is adapted for mounting upon a wall surface in unobtrusive manner, for example, the wall of a utility area within a commercial building or upon a basement or a closet wall of a typical residence. After installation, direct access to the panel itself is normally not required for control of the various circuits and systems or for additional programming for particular applications.

Typically, the building intelligence system receives its power from a usual 115 volt ac, 60 Hz source which preferably is a home run outlet directly connected through a fuse or circuit breaker to the building electrical power panel. An uninterruptible power supply is provided for the system and the power supply may comprise a six volt battery, a suitable electrical input together with a suitable battery charge device. The intelligence system of the present invention includes generally an input terminal strip for hard-wired inputs, an output terminal strip for relay outputs, a multi-channel carrier current interface with wireless carrier current modules of known design and suitable logical networks. While the building intelligence system is designed for stand-alone installation and operation, the use of a standard RS232 interface permits the system to communicate with any personal or business computer for additional programming for specific applications, for video dlsplay, status checking, and the like.

A simple control language has been developed to provide commands for storage within the logical network which can then be used to control the various systems in and about the home or other building. The networks are scanned four to ten times each second. Binary storage registers are provided and all manipulation of the intelligence system is achieved through the use of the registers. The registers include a plurality of dedicated registers and additionally, a plurality of general-purpose registers which may be defined by the user. The control language comprises commands which are recognized by the intelligence system for the control of the various building systems. The commands are provided to manipulate the registers and all of the logical control devices forming part of the system. The commands may be executed from a separate personal computer or as part of the networks. Commands are provided to manipulate registers and all of the logical control devices. Other commands are employed to function a power-line carrier transmitter for control of suitable wireless carrier current modules.

Sixteen twenty-four hour on/off schedules are followed with user-specified output registers being turned ON/OFF accordingly. In addition to a 15 min resolution, each schedule is enabled/disabled according to a 7-bit day-of-week schedule. Event counters are included which are decremented each time a suitable command is executed. The counters have a range of from 1 to 60,000 counts.

The building intelligence system includes seconds timers comprising a user-defined output register which is activated upon timeout. A user-defined input register gates the timing of the timers, which timers have a range of 1 second to 18 hours. Alarm clocks are included whereby at the defined time, a user-specified output register is activated. The alarm clocks may be enabled/disabled according to a 7-bit day-of-week schedule. Calendar events are included whereby at 12:00 AM on a preset date, a user-specified output register will be activated.

The building intelligence system further includes data monitors to monitor or log the total time in minutes that a reference input register is on or is at a logical "1". A capacity of up to 60,000 minutes can be accumulated.

The circuitry includes sequencers whereby each time the sequencer is incremented, the next designated internal register will be turned ON and the previous internal register turned OFF. The sequencers are of variable length and are recirculating.

A carrier current table includes channels which are referenced to dedicated input registers. When an indicated register experiences a logical transition, that is, a change from ON to OFF or from OFF to ON, a suitable command is transmitted through the building permanent electrical wiring system.

Upon the occurrence of a power failure, designated registers will automatically be turned OFF. The system is arranged whereby the status of all timers, counters, networks, etc. will be preserved during the power outage.

The building intelligence system of the present invention interacts with the building to be controlled and includes extensive input/output capabilities. Through a carrier current interface with 256 channel capability, the system can communicate with known carrier current modules such as the carrier current operated switches which have been developed and are currently being sold by Leviton Manufacturing Co., Inc. and BSR Corporation. Through the use of such carrier current modules, specific circuits within the building can be turned on and off or optionally, can be dimmed to a preset level.

In the preferred embodiment, thirty-two separate on/off switching devices are provided for input signal sensing which may be monitored by using the integral wiring terminations in the intelligence system. The input interface accepts dry contact closure, open collector and voltage level inputs without any signal conditioning that is external to the intelligence system itself. Optionally, sixteen of the signal sensing inputs may double as analog inputs for enabling the direct inputting of data such as temperatures, pressures, humidities, etc. In addition to the analog computation commands, complex custom control algorithms optionally may be implemented to achieve optimal control of a given facility. The ability to input analog values further enables the direct implementation of 'supervised' sensing of low voltage security alarm systems and fire alarm systems, thereby incorporating the ability to determine both short circuit and open circuit conditions in the monitored systems.

A relay output control includes 8 SPDT 125 v relays which are provided with form "C" contacts (both NO and NC). The relays may be used to control various loads in a building and are wired with the ability to operate through a power failure. If desired, a plurality of LED lamps can be provided in the front panel for display or annunciation of any selected set of conditions relative to the operation.

Programming for control of the building intelligence system is achieved by using a personal computer which communicates through a usual RS232 interface. A novel "English Worded" control language has been developed so that virtually any control strategy may be implemented. Control is implemented by using the following application-definable programming functions:

1. Logical Networks are used to implement feedback switching functions using conventional logical functions to simulate complex "network" control structures. These logical networks may be used to define conditional control of lighting, temperature, smoke detectors, heat detectors, security alarms, etc.

2. Energy Management functions are set up to provide for conditional shedding of loads and time-sharing duty cycle control of the loads. These power functions allow the user to specify a table of devices in his facility which must operate in a coordinated fashion to achieve energy savings. For example, large power-consuming devices may be prevented from operating at the same time by giving priority to certain of the devices and by specifying a maximum power load for the facility. Duty cycling functions permit large power consumers to operate in an "interleaved" fashion. While they may appear to operate continuously, they can be sequentially turned on and off to permit power to be drawn alternately from one device to the next.

3. Scheduling of loads over a twenty-four hour period for a given set of days of the week allows the demand for power to follow the need for the products of that power. In addition to scheduling events throughout the day and other events which must occur once per day, an entire holiday schedule of up to thirty-two dates can be programmed for an entire year.

4. An eight diode front panel display can be provided which is application-defined to indicate any eight conditions internal to the facilities operating program. The programmer therefore can dictate the meaning of these indicators to provide non-skilled personnel with the ability to diagnose certain kinds of operating problems For example, one light might be programmed to indicate the failure of an air conditioning system to thereby indicate the need for certain maintenance procedures; another may monitor low water level in a boiler, etc.

It is therefore an object of the present invention to provide a novel building intelligence system that is capable of total home control including energy management, home security, lighting control, safety monitoring, home performance monitoring and appliance control.

It is another object of the present invention to provide a novel building intelligence system that provides ability for interaction between security, energy, fire, safety and lighting systems within a home can enhance the safety and comfort of the occupants in a manner never heretofore possible with the completely separate and independent system.

It is therefore an object of the present invention to provide a novel building intelligence system that is capable of total home control including energy management, home security, lighting control, safety monitoring and appliance control.

It is another object of the present invention to provide a novel building intelligence system that is housed within a single compact enclosure and includes an uninterruptible power supply, hard wired inputs, relay outputs, a power line carrier transceiver, the capability of personal computer communications through an RS232 interface, and a network protocol on two wires.

It is another object of the present invention to provide a novel building intelligence system that includes a built in computer including a communications capability with a personal computer through an RS232 interface, the computer being completely programmable without preconceived notions of any preexisting environmental systems.

It is another object of the present invention to provide a novel building intelligence system for total building control and which includes the necessary flexibility to implement any capability through microprocessor control.

It is another object of the present invention to provide a novel building intelligence system that comprises a dedicated microcomputer system in a compact, self-contained panel, an input board for hard-wired, low voltage systems, a relay output board for house voltage operations and the capability of functioning a plurality of power-line carrier modules.

It is another object of the present invention to provide a novel building intelligence system that is self-contained in design, that is readily programmable to control local systems and that is relatively inexpensive in manufacture.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 7 is an explanatory representation of a Stack in the representative form of a book stand.

FIG. 8 shows the Stack of FIG. 7 with a representative black book PUSHed on the Stack.

FIG. 9 shows the Stack of FIG. 8 with a representative black book POPped from the Stack.

FIG. 10 shows the Stack of FIG. 9 with five representative white books PUSHed on the Stack.

FIG. 11 shows the Stack of FIG. 10 with one representative white book POPped from the Stack.

DESCRIPTION OF THE PREFERRED EMBODIMENT OF THE INVENTION

Figure 1:
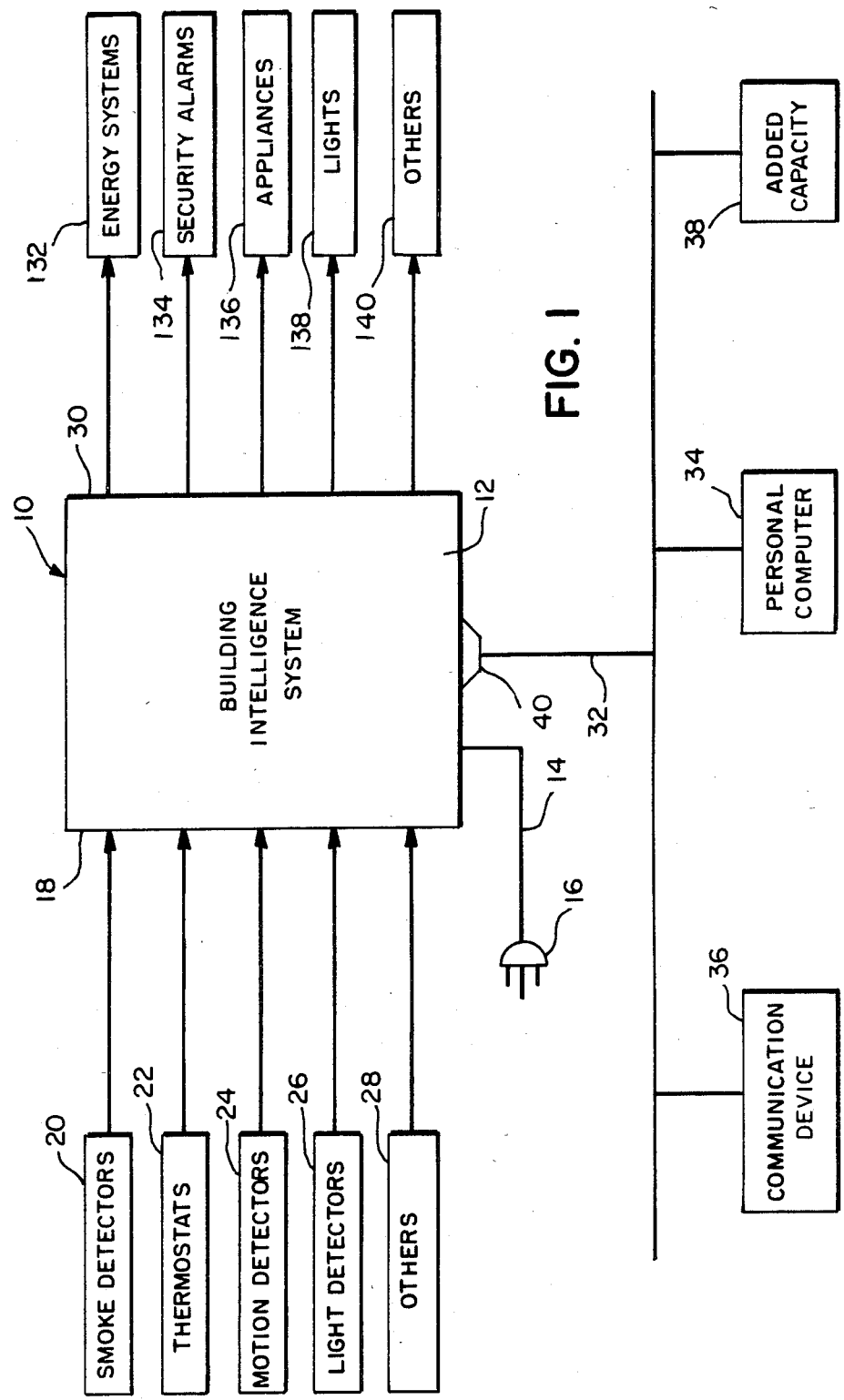
FIG. 1 is a block diagram showing generally the input and output connections to the building intelligence system.

Although specific terms are used in the following description for the sake of clarity, these terms are intended to refer only to the particular structure of the invention selected for illustration in the drawings, and are not intended to define or limit the scope of the invention.

Referring now to the drawings, there is illustrated schematically in FIG. 1 a building intelligence system 10 which comprises generally a self-contained, compact panel 12 that is suitable for mounting upon a flat wall, for example a wall in a utility area of a commercial building or a basement or closet wall in an average home. A usual power cord 14 and plug 16 provides electrical power in well known manner from any suitable 115 volt AC, 60 Hz power source. The power source preferably comprises a wall receptacle (not shown) which should be connected in well known manner to the building power panel in a home run circuit without any other outlets. The input side 18 of the panel 12 includes a terminal strip output means to connect a plurality of hard-wired devices, for example, smoke detectors 20, thermostats 22, motion detectors 24, light detectors 26 and other similar devices 28. The hard-wired devices that are connected to the input side 18 should function at low voltage and are generally of the type used in and about buildings to provide information to the building intelligence system with regard to specified activities and conditions within the building.

The output side 30 of the panel 12 is provided with terminal strip output means to connect various output devices which are to be controlled by the building intelligence system through suitable relays such as energy systems 132, security systems 134, appliances 136, lights 138 and other devices 140 of similar nature.

A party line comprising a two wire home communications network 32 connects into the building intelligence system to provide additional features and capabilities, such as the interface to a personal computer 34, a desired additional communication device 36 or perhaps added capacity 38 in the nature of an additional similar building intelligence system. The interface with the personal computer 34 can be easily made in known manner through a conventional interconnection, for example, a standard RS232 interface 40.

Figure 2:
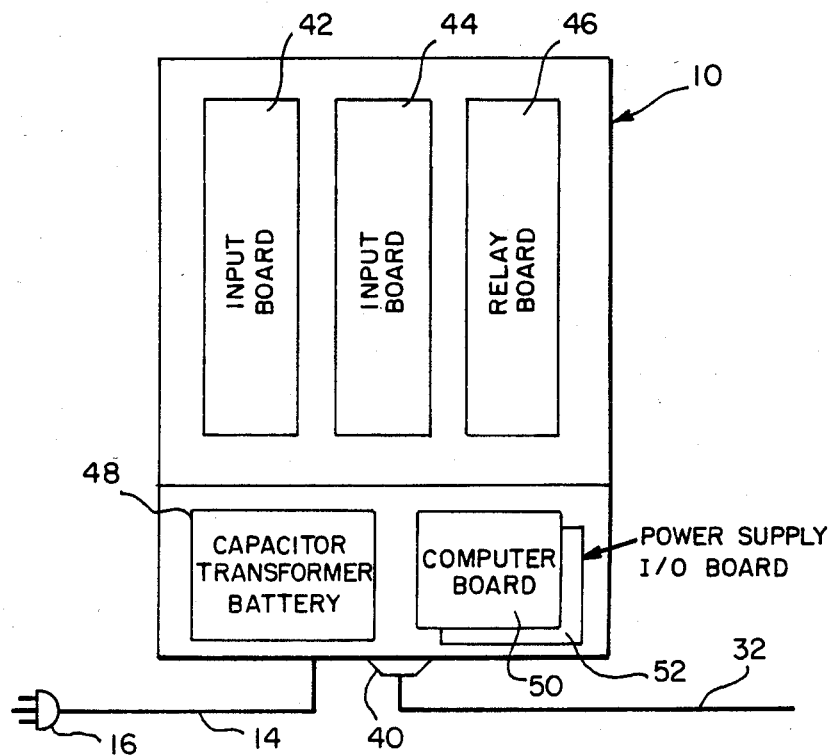
FIG. 2 is a schematic representation showing the major components of the building intelligence system.

Referring now to FIG. 2, the building intelligence system 10 comprises generally a pair of similar input boards 42, 44, each of which contains a plurality of buffered, protected digital inputs. In the illustrated embodiment, a plurality of thirty-two buffered, protected digital inputs can be provided; when necessary, the capability can be easily expanded to sixty-four inputs. Accordingly, thirty-two separate on/off switching devices may normally be monitored using the integral wiring terminations provided in the system. The input interface accepts dry contact closure, open collector, and voltage level inputs without requiring any signal conditioning external to the building intelligence system 10. Optionally, sixteen of the inputs can be wired to double as analog inputs to thereby enable the direct inputting of data such as temperatures, pressures, humidities, etc. Along with the optional analog computation commands, complex custom control algorithms may be implemented to achieve optimal control of any given facility. This ability to input analog values also enables the direct implementation of 'supervised' sensing of security system and fire alarm system wiring to provide the capability of determining both short circuits or open circuits in the alarm and security circuitry when desired.

An output relay board 46 contains a plurality of 125 volt relays, for example 8 SPDT 3A relays which are provided with form "C" contacts (both NO and NC). These relays are wired to dedicated terminals on an output terminal strip and may be utilized to control various electrical loads in the building, for example, alarm devices, appliances, motors, etc. In the preferred embodiment, the relays are wired to provide the additional benefit of the ability to operate through a power failure.

An uninterruptible power supply 48 is an important feature of the system 10 and comprises generally a power supply capacitor, a transformer and batteries in known manner to assure continuous operation of the system 10 at all times. Adjacent to the power supply 48 within the cabinet or panel 12 are registered a computer board 50 and a power supply input/output board 52. The power supply input/output board 52 is designed and wired as a carrier current interface to communicate with any of a number of known type power line carrier modules, for example, the carrier current module manufactured and sold by Leviton Mfg. Co. Inc. or module BSR-X-10 as manufactured and sold by BSR Corporation. In the preferred embodiment, a 256 channel capacity is provided in the board 52 whereby an enormous number of devices may be controlled in a programmable manner without requiring additional external wiring.

Figure 3:
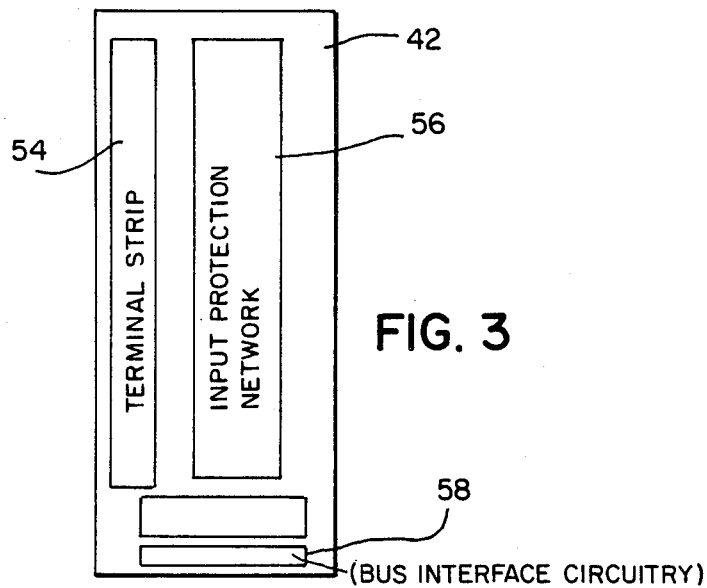
FIG. 3 is a diagrammatic representation of the input board illustrated in FIG. 2.

Referring now to FIG. 3, each input board 42, 44 comprises generally a terminal strip 54 for connecting hard-wired devices and a suitably designed input protection network 56. A peripheral bus interface circuitry 58 is provided to render the input board functional.

Figure 4:
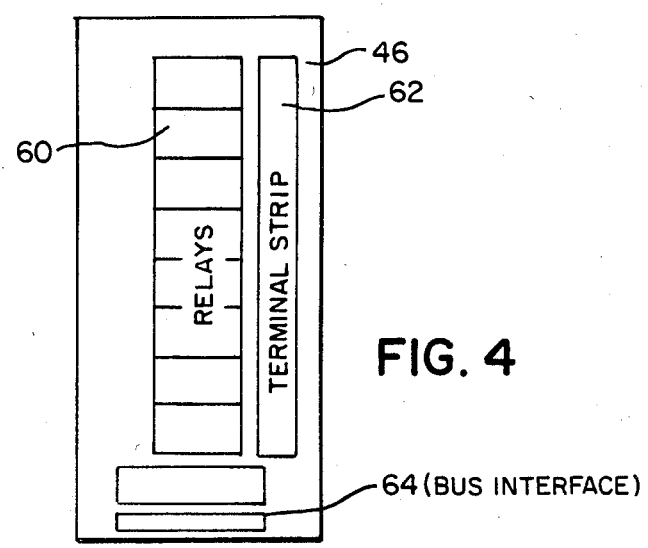
FIG. 4 is a diagrammatic representation of the relay board illustrated in FIG. 2.

As shown in FIG. 4, the output relay board 46 comprises a plurality of 125 volt SPDT relays 60 and an adjacent terminal strip 62 having certain of the terminals dedicated for functioning with the relays 60. A suitable peripheral bus interface circuitry 64 is provided to functionally complete the relay board 46.

Figure 5:
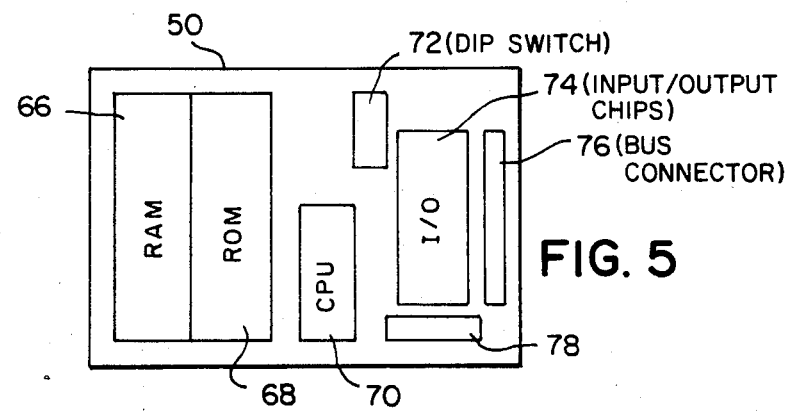
FIG. 5 is a diagrammatic representation of the computer board illustrated in FIG. 2.

As shown in FIG. 5, the computer board 50 comprises generally the internal computer components RAM 66, ROM 68 and CPU 70. A baud rate and network address select DIP switch 72 is provided together with suitable input/output chips 74, a peripheral bus connector 76 and necessary timing and reset circuitry 78.

Figure 6:
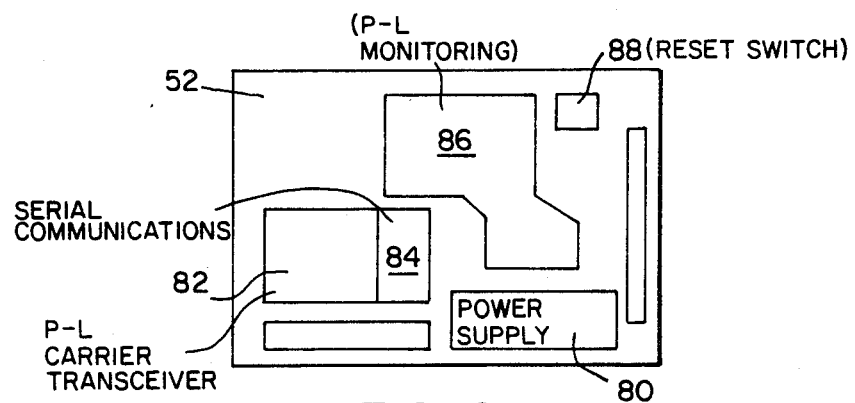
FIG. 6 is a diagrammatic representation of the I/O power supply board illustrated in FIG. 2.

Referring now to FIG. 6, the power supply input/output board 52 comprises a triple power supply 80 comprising generally a five volt main power supply, a five volt battery power supply and a 6.9 volt battery charge device of known construction. A power-line carrier transceiver 82 is provided to communicate with carrier current operated devices (not shown) that are to be installed within the building. The devices may include switches or transducers of known design, for example, the carrier current modules manufactured by Leviton Mfg. Co., Inc. A serial communications 84 provides a 60 Hz input for the clock as hereinafter more fully discussed. Suitable power-line monitoring circuitry 86 is provided together with a system reset switch 88 in known manner. The power-line carrier transceiver and power-line monitoring circuitry are wired to preferably provide 256 channel AC wireless control capability.

In order to use the building intelligence system 10, it will be appreciated that the intelligence system incorporates a dedicated computer which is designed to enable a programmer to manipulate various devices and systems within a building in a controlled manner. To program the computer, it is necessary to understand the relationships among five basic operating concepts as follows:
1. Registers
2. Devices
3. Commands
4. Networks
5. The stack.

As utilized herein, "Registers" are defined as binary memory locations which are used to store information about the operation of the building within which the building intelligence system 10 is stored. In the preferred embodiment, there are 192 Registers. Each Register can be read to determine whether it is ON or OFF or whether it has just changed.

Some of the Registers are predefined and others are user-defined. The predefined Registers are associated with specified inputs, with specified relay outputs, and with specified power-line carrier outputs. The other, remaining Registers are user-defined. In the preferred arrangement the first input channel in the intelligence system 10 will be associated with Register "0" and therefore, by referencing Register "0" in a program, there will always be provided information about the device wired to these terminals.

As herein utilized, the term "Devices" is defined to mean devices which are to be manipulated by the intelligence system 10 in the three general classes, namely, hard-wired devices, power-line carrier devices, and "simulated" devices.

The hard-wired devices are those systems which are connected to the input board terminal strips 54 using low-voltage intercom cable. Such devices include smoke detectors, heat detectors, motion detectors, thermostats and the like. These input devices provide information to the intelligence system 10 concerning activities in and about the building. The relay board 46 contains connections to various output devices which are controlled by the relays 60 on that board, such as, fire alarm bells, burglar alarm sirens, emergency lighting units, etc. The input and output connections on the input boards 42, 44 and the relay board 46 are internally linked to the system registers.

The power-line carrier devices are carrier current operated switches such as BSR-X-10 and Leviton home control modules as previously discussed. These devices are turned on and off when the intelligence system 10 sends signals through the permanent house wiring system. In the preferred embodiment, 256 different channels of these devices are provided, thirty-two of which are directly linked to specified, pre-selected system internal Registers. These output devices can include lights, appliances, air conditioners, radios and other electrical appliances found in and about a home or building.

The "simulated" devices are software "black boxes" which are specifically designed for manipulation by the intelligence system 10. These devices are designed and provided to work much like their real-world counterparts. For example sixteen alarm clocks are provided in the system 10, each of which has a time setting for when it goes off, a master switch to enable the alarm and an alarm which is sounded. As designed in the system 10, the alarm sounded is a Register being turned on. Other simulated devices include data monitors, schedules, calendar events, sequencers, timers and counters. At the beginning of the programming, those devices which are to be used are hooked up to the internal intelligence system Registers by specified programming Commands, as hereinafter more fully set forth.

As employed herein, the "Networks" can be defined as the glue which ties all of the devices together into a complete building control strategy. Thirty-two Networks preferably are provided and each one can contain a short user program which can perform one or more functions. For example, the following Network has two commands which link a switch which is wired to input 0, to a light which is wired to the first relay 60 on the relay board 46 which can be designated as register 71:
INPUT 0
OUTPUT 71.

Each Network has the ability to manipulate devices through the manipulation of Registers. As designed, Networks may also manipulate Networks. Each Network may be individually turned on and off either from a personal computer keyboard 34 or from commands placed in other Networks. The Networks programmed by the user are executed four to ten times each second in order to control the building.

As used herein, "Commands" are defined as single control statements which tell the intelligence system 10 to perform a predetermined function. The REATIM command, for example, instructs the system 10 to read the real-time clock and return the current time through the RS232 port.

Most Commands may be used directly from the personal computer keyboard 34. Also, the Commands may be placed together to form programs which comprise the Networks. The Commands in the system instruction set make extensive use of the system "Stack", as hereinafter defined and more fully set forth. The Stack is used by one Command to determine the result of action by the previous Commands. Through this mechanism, strings of Commands which form Networks can create either very simple or extremely sophisticated control strategies.

As used herein, the term "Stack" is defined as a key structure in both operating and understanding the system. In the preferred embodiment, the Stack of the system 10 is a "Boolean" stack which is LIFO (last-in first-out) and 8 bits deep.

To understand the operation of the system Stack, it is convenient to consider the Stack in the form of an inclined book stand 90 (FIG. 7) of size to contain eight books. The books 92 are either black or white and the stand 90 has the capacity to hold up to eight books. For purposes of discussion, books will be added or taken away from the Stack 90 only at the bottom 94 thereof. As illustrated, the eight books are numbered from zero to seven to conform to computer numbering conventions.

Whenever the Stack 96 is CHECKED, the color of the book at the bottom will be determined. In the configuration of FIG. 7, it will be noted that the book designated "0" is white.

In accordance with the teachings of the present invention, there are two ways to change what is on the inclined book stand 90:

1. The addition of a book on the book stand 90 at the bottom 94 thereof is defined as "PUSHing" a book 92 on the Stack 96.

2. To take a book from the bottom 94 of the Stack is herein defined as "POPping" a book from the Stack.

For example, referring to FIG. 8, to PUSH a black book 98 on the Stack, the books previously on the stand 90 will slide up one position to form the Stack 96'. Then upon CHECK of the Stack 96', the black book 98 will be noted.

Referring now to FIG. 9, if it was then decided to POP a book from the Stack 96', then the black book 98 that was just PUSHed on the Stack would be removed and the remaining books would slide down the incline. Upon CHECK of the Stack, a white book 100 would be indicated as illustrated in the Stack 96".

As illustrated in FIG. 10, if five white books 100 were PUSHed on the stand 90 as illustrated, the fifth book that was PUSHed on would cause a book to fall off of the top 102, which in the illustrated example would be the black book 98. In the operation of the system Stack 96''', the black book 98 which was forced off of the top 102 of the stand 90 would be lost. Therefore, if the bottom book was then POPped off of the stand 90, the remaining seven books would slide down toward the bottom 94 to leave only six books on the stand 90 as illustrated in FIG. 11.

When describing Commands to operate the system 10, the Stack should be considered as the book stand 90 as illustrated in FIGS. 7-11 with white books as OFF states and black books as ON states. The positions in the Stack are numbered S(0) to S(7) in the manner illustrated by the positions of the books 98, 100 in the Stack.

The components of the computer board 50 are operated by using COMMANDS which are sequences of ASCII codes which are transmitted through the RS232 interface 40 of the personal computer 34. These COMMANDS either direct the intelligence system 10 to execute their contents immediately or to place them within designated Networks for execution as part of the system program.

In known manner, COMMANDS are sent to the system 10 using single byte tokens followed by any data required by the individual COMMAND by using a protocol which includes an 8-bit checksum. Transmission is achieved by using a short BASIC or Assembly Language routine which is normally provided with the personal computer 34.

COMMANDS in the Networks are used to control the various devices in and about the home or other building. Most COMMANDS may be used either in the immediate mode or as part of Networks and are used to manipulate the functions of the system 10 to set up the system operations.

For programming the intelligence system 10 to control the various building systems and functions, an "English Worded" control languages has been developed and the following represents exemplary COMMAND language:

| COMMAND | FUNCTION |
|---------|----------|
| ENANET | Setss the status byte of a designated Network to executing. |
| DISNET | Disables execution of Network by setting bit seven of the status word to zero if the Stack is found to be ON when checked. |
| SKPNET | Checks the Stack and if an OFF is found, causes the system to skip the rest of the COMMANDS in a Network. |
| CLRNET | Erases Network if the Stack is checked and found to be ON. |
| INPUT | PUSHes the current status of any reference input Register onto the Stack. |
| TRUP | Checks the Reference Input Register for a transition from OFF to ON since the previous scan. The result is PUSHed onto the Stack. |
| TRDN | Checks the Reference Input Register for a transition from ON to OFF since the previous scan. The result is PUSHed onto the Stack. |
| TRCH | Checks the Reference Input Register for a transition for either change, PUSH the current value onto the Stack, and in response PUSHes an ON if a change has occurred or an OFF if no change has occurred since the previous scan. |
| OUTPUT | Checks the Stack and turns ON/OFF the Reference Output Register accordingly. |
| OUTCON | Conditional output command designed for use in conjunction with TRCH command. Checks the Stack to see if an ON is present. If an ON is found, POPs the Stack and actuates the reference output register reflecting what is found the second time the Stack is checked. If an OFF was initially found, no action occurs. |
| OUTCC | Provides direct linkage to carrier current interface commands. Upon execution of OUTCC Command, a TRCH is executed on the Input Reference Register. If a change has not occurred, no further action is taken. If a change has occurred, a change to an ON will result in the transmission |

| COMMAND | FUNCTION |
|---|---|
| | of the carrier current command. If the change was to OFF, an OFF command is sent. |
| ONREG | Turns ON designated Reference Output Register when executed. |
| OFFREG | Turns off Reference Output Register when executed. |
| AND | Logically AND's the previous two stack entries and PUSHes the result on the Stack. |
| OR | Logically OR's the previous two entries on the Stack and PUSHes the result on the Stack. |
| XOR | Logically exclusively OR's the previous two Stack entries and places the result on the Stack. Useful for flipping the state of a register. |
| NOT | Inverts the last entry on the Stack. |
| ON | PUSHes an ON onto the Stack. |
| OFF | PUSHes an OFF onto the Stack. |
| PUSH | PUSHes the Stack to create a duplicate of the last entry on the Stack. |
| POP | POPs the Stack to recover a previous result. |
| DEFCNT | Establishes a link between one of the sixteen counters and a Register. The Register will be turned ON when the counter is decremented to zero. |
| SETCNT | Sets a counter to a new value after initially checking the last value on the Stack to see if it is ON. |
| DECCNT | Used to decrement a counter and its operation is conditional upon the state of the Stack. If the Stack is found to be ON when checked, the specified counter is decremented if its count is not zero. |
| REACNT | Used to read a counter and 3 bytes are returned. |
| DEFTMR | Used to cause a timer to be associated with a desired Input Reference Register and Output Register. When this Command is executed, the timer is left in the disabled state. |
| SETTMR | Used to set a timer to a new time count. When SETTMR is executed, the last value on the Stack is checked; if it is an ON, the appropriate timer is set. |
| ENATMR | Used to enable timing for a timer. When ENATMR is executed, the last entry on the Stack is checked; if an ON is found, the appropriate timer is enabled. |
| DISTMR | Used to disable a timer. When DISTMR is executed, the last entry on the Stack is checked; if it is an ON, the appropriate timer is disabled. |
| REATMR | Used to read the time remaining, definition and status of a timer. |
| DEFALM | Used to define the operating characteristics of an alarm clock, namely, its Output Reference Register and its Day-of-Week Enable Schedule. |
| SETALM | Used to set an alarm clock to a given time. When executed, SETALM checks the last entry on the Stack; if it is an ON, then the alarm clock is set and the Output Register is turned OFF. |
| ENAALM | Used to enable an alarm clock's operation. Once enabled, an alarm clock will cause its Output Reference Register to be turned ON when its time setting is reached. When ENAALM is executed, the last entry on the stack is checked; if this value is an ON, then the appropriate alarm clock is enabled. |
| DISALM | Used to disable the operation of an alarm clock. When executed, DISALM checks the last entry on the Stack; if it is an ON, then the appropriate alarm clock is disabled. |
| REAALM | Used to read an alarm clock. Used only in the immediate mode and not as part of a Network. |
| DEFCAL | Used to cause a selected Output Reference Register to be associated with a given calendar event. |
| SETCAL | Used to set the date for a calendar event. SETCAL first checks the last entry on the Stack; if it is an ON, the date is set. |
| REACAL | Used to read the status of a calendar event. |
| DEFMON | Used to begin monitoring any Input Reference Register. Upon executing DEFMON, the system automatically zeroes the monitor's count and sets it to monitoring the Input Reference Register. |
| REAMON | Reads a data monitor and returns 4 bytes. |
| DEFSCD | Used to define a schedule. It allows an Output Reference Register to become associated with a selected schedule and also allows a schedule to be defined for operation on a given set of days of the week. |
| SETSCD | Used to set the desired ON/OFF schedule. Each data byte required by SETSCD covers a two-hour period during the day. The bits in the data bytes correspond to eight fifteen-minute periods within the two-hour period. |
| ENASCD | Used to enable operation of a schedule. When ENASCD is executed, the last entry on the Stack is checked; if an ON is found, the appropriate schedule is enabled. |
| DISSCD | Used to disable operation of a schedule. When DISSCD is executed, the last entry on the Stack is checked; if an ON is found, the appropriate schedule is disabled. |
| REASCD | Used to read a schedule and its definition. Should be used in the direct mode only and not as part of a Network. When executed, REASCD will return 14 bytes. |
| SETTIM | Used to set the real-time clock. |
| REATIM | Used to read the real-time clock; 3 data bytes are returned by REATIM. |
| SETDAT | Used to set the current date and day of the week used by the real-time clock. |
| READAT | Used to read the current date from the real-time clock; 4 bytes are returned. |
| DEFCC | Used to define entries in the carrier current table. |
| REACC | Used to read the entire carrier current table from the system. All 32 entries are returned in order; REACC should only be used in the direct mode and not as part of a Network. |
| DEFPF | Used to set an entry in the Power-Fail table. |
| REAREG | Used to read a Register's status including its Power-Fail table entry. |
| ENAPAS | Must be used to enable the system communications. Once ENAPAS is successfully applied using a current valid password, the system will communicate freely. |
| DISPAS | Will disable the system communications until a valid ENAPAS command is next received. |
| NEWPAS | Used to assign a new password to the system; can be used only after a successful ENAPAS has been executed. |
| ENAJOG | If last entry on the Stack is an ON, the ENAJOG command will offset schedules and alarm clocks by a random time of −15 to +15 minutes each day. |
| DISJOG | Restores accurate timing to schedules |

| COMMAND | FUNCTION |
| --- | --- |
| | and alarm clocks. |
| DEFSEQ | Used to define a sequencer by indicating the register which is to be started or "reset" position of the sequencer and the number of steps in the sequence. |
| INCSEQ | Executed to step or increment a sequencer. |
| CLRSEQ | Used to reset or clear the sequencer back to its starting register. |
| REASEQ | Used to read the status and definition of a sequencer; should be used only in the direct mode and not as part of a Network. |
| DEFSHD | Used to set up load shedding channels. Causes a shed channel to be associated with a given output Register and allows specification of maximum OFF time and minimum ON time for the channel. |
| SHED | Checks Stack and if ON, sheds the load. |
| ENASHD | If ON is found in a Stack, enables shedding of this channel. |
| DISSHD | If Stack is ON, the channel is disabled. |
| REASHD | Used to read the status of the channel. |
| DEFDTY | Used to cause starting Register to be associated with the duty cycle table and setting of the duty cycle time interval. |
| SETDTY | Allows the setting of duty cycle schedules if the Stack is ON. |
| ENADTY | If Stack is ON, duty cycle is enabled. |
| DISDTY | If Stack is ON, duty cycle is disabled. |
| READTY | Reads the status of a duty cycle channel. |
| INPVAL | Reads the value of an analog channel and PUSHes it on the analog Stack. |
| OUTVAL | Stores the last entry on the analog Stack in the analog register table. |
| CONVAL | PUSHes a constant value onto the analog Stack. |
| ADD | Adds the last two values on the analog Stack. |
| SUB | Subtracts the last two values on the analog Stack. |
| MLT | Multiuplies the last two values on the analog Stack. |
| DIV | Divides the last two values on the analog stack. |
| CMP | Compares the last two values on the analog Stack and the result is reflected on the binary Stack, |
| CLR | Clears the analog Stack. |
| APUSH | PUSHes the analog Stack. |
| APOP | POPs the analog Stack. |
| EXC | Exchanges the last two entries on the analog Stack. |
| REAVAL | Reads the analog Register table. |
| ASTTMR | Sets a timer from the analog Stack. |
| ASTCNT | Sets a counter from the analog Stack. |
| ALDTMR | Loads the analog Stack from a timer. |
| ALDCNT | Loads the analog Stack from a counter. |

The computer of the system 10 comprises sixteen 16-bit counters, Each counter has an associated Reference Output Register. The counters are decremented following each successful execution of a DECCNT command. Upon being decremented to zero, the Reference Output Register is turned ON and further counting ceases until the counter is reset. Setting the counter to a new count is possible at any time. Upon setting the counter, the Reference Output Register is turned OFF. The Reference Output Registers of the 16 counters are defined using the DEFCNT command. The status of the counters can be determined at any time by using the REACNT command.

Sixteen 16-bit seconds timers are provided which may be utilized for various timing purposes. The 16-bit size allows for the timing of intervals from one second to 18 hours. Each timer has a Reference Input Register and a Reference Output Register. These may be specified to any legal value using DEFTMR command. When enabled, a timer is decremented once each second if the Reference Input Register is ON. When a timeout occurs (zero time left on a timer ), the Reference Output Register is turned ON. In addition to being gated by the Reference Input Register, the timers may be externally disabled using the DISTMR command. This action can be reversed using the ENATMR command or by setting the timer with the SETTMR command. The SETTMR command sets the timer to the desired values, causing the Reference Output Register to be turned OFF, and automatically enables the timer for timing.

Alarm clocks are used to cause the system to actuate a Reference Output Register at a particular time of the day. Sixteen system alarm clocks have associated with them a seven day-of-week enabling schedule. Therefore, a given alarm clock can actuate its Output Reference Register on Mondays, Thursdays, and Saturdays, for example, or any combination of the days of the week. In addition, alarm clocks can be enabled and disabled using the ENAALM and DISALM commands. At the time setting of the alarm clock, the status of the alarm clock is checked. Assuming that the alarm clock is enabled and that the day-of-week schedule indicates that the device is enabled on that day, the appropriate Output Reference Register will be turned ON.

Calendar events may be programmed to cause any Output Reference Register to be set at 00:00 (12:00 AM) on any given day. The Output Reference Register associated with a calendar event is selected using the DEFCAL command. When setting the date of a calendar event using SETCAL, the Output Reference Register is automatically turned OFF.

Schedules are provided which are extremely powerful functions to permit the user to define an Output Reference Register which will follow a 24-hour schedule with 15 minute resolutions. Any number of ONs and OFFs may be selected for the Output Reference Register. In addition, schedules may be defined to be active only on certain days of the week. Schedules may be enabled or disabled using the ENASCD and DISSCD commands. An important feature of schedules is that the Output Reference Register is only affected when there is a transition in the schedule from ON to OFF or from OFF to ON. This allows other programming to override a schedule for the immediate time period, yet not affect the next scheduled change. The Output Reference Register, therefore, will only be affected if the schedule is enabled, the schedule is selected on the present day of the week (using the day-of-week schedule) and a transition is scheduled to occur at this time. All schedules are checked at 15 minute intervals to determine if an action is to be taken.

The intelligence system 10 includes a real-time clock which keeps track of the time to the nearest second, the date, the year, and the day of the week. The time is set according to a 24-hour clock. The time and date can be individually set and read at any time using the SETTIM, REATIM, SETDAT and READAT commands.

The current carrier table provided as part of the system is 32 bytes long. The entries in this table are set using the DEFCC command to cause 32 of the system's internal Registers to become associated with channels of the carrier current modules. If an internal register for example, a Register from 128-159 changes state, the appropriate carrier current channel is automatically actuated through the carrier current interface. The REACC command is used to read out the entire carrier current command table.

At the time a power failure is detected, the system makes use of a power failure table to turn OFF certain internal registers. This facility is provided so that certain devices can be forced into a known state when the power failure occurs. When power is restored, the system automatically executes one complete scan through the Networks and then reactivates all carrier current modules in its carrier current table to the present state of their reference registers, for example, Registers 128-159. If these Registers are unmodified by using the power-fail table, they will be restored to their original status before the power failure. All of the system relays will reflect the current status before, during, and after power failure with the exception of those which correspond to Registers modified at the Power-Fail time due to entries in the power-fail table. The first time the system is powered up, all entries in the power-fail table are set to the no-action state ("0"). One Register, for example number 160, will be set upon a power-failure recovery so that a transition will appear to have occurred to its current state. This may be used to determine that power has been restored. The Commands DEFPF and REAREG are used in conjunction with power failure.

A password control has been provided and the system has the ability to recognize a 4-byte password. This allows the owner to restrict access to the system's commands and programming. When powered up for the first time, the system sets the password automatically to 0,0,0,0. Communication with the system cannot begin until the ENAPAS 0,0,0,0 command is given. Once the password has been changed using the ENAPAS command, the system will from then on respond only to the new password. The DISPAS command will send the system into an ignore mode and the system will not respond to any communications until it receives a valid ENAPAS command.

During long absences; a feature is provided to provide the ability to vary scheduling so that it is not too predictable. The JOG functions provide the capability to randomly adjust the clock once each day at midnight to achieve this variation. The ENAJOG command enables this operation; the DISJOG command reverts back to normal, accurate timing. The timing is adjusted for all alarm clocks and schedules. All other aspects of timing will remain unaffected.

Sequencers are included to provide the ability to stimulate stepping switches using the system registers as the individual contacts. The DEFSEQ command allows a sequencer to be set up pointing to a first Register in a sequence (the OFF state) and the number of positions of the stepping switch. Each time an INCSEQ is executed, the switch is "stepped" to the next position. The Register of that previous step is turned OFF and that of the new step is turned ON. CLRSEQ is used to reset the stepping switch back to the starting position. All sequencers are recirculating such that incrementing the sequencer past its length returns it to the starting position.

By utilizing the apparatus and method of the present invention, a complete building control system has been provided to provide a comprehensive and totally flexible building control including the ability to control the function of energy systems, security systems, lighting systems, various appliances, emergency systems and the like. It is interesting to note that by employing a personal computer and a suitable modem, the capability of remote operation of the system by telephone can also be provided. Additionally, optional analog input capability can be provided by adding an optional analog input board to enable the direct inputting of data such as temperatures, pressures, humidities, etc. Along with the analog computation commands, complex custom control algorithms may be implemented to achieve optimal control of a given facility. The ability to input analog values also enables the direct implementation of 'supervised' sensing of security and fire sensors yielding the ability to determine both shorts and opens in the field wiring.

Although the present invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. An intelligence system for montioring and controlling a plurality of electrical systems, mechanical devices, power-line carrier devices and output devices in a building comprising input board means to connect a plurality of hard-wired devices to input information from the hard-wired devices;

power-line carrier transmitter means adjacent to the input board means to individually communicate with a plurality of power-line carrier devices;

dedicated computer means mounted adjacent to the input board means and the power-line carrier transmitter means to receive the information from the hard-wired devices and to communicate with the power-line carrier devices through the power-line carrier transmitter means, the dedicated computer means comprising a first and second plurality of uniformly operating register means to receive information about the building and to store information about the building;

output board means adjacent to the input board means to connect a plurality of output devices, the output board means being in communication with the dedicated computer means to control the operation of the output devices, the dedicated computer means comprising a third plurality of uniformly operating register means to transmit control information to the output devices;

power supply means to furnsih an uninterruptible power supply to the input board means, the power-line carrier transmitter means, the dedicated computer means and the output board means; and interface means comprising an interconnection and a personal computer to permit communication between the dedicated computer means and the personal computer.

2. The intelligence system of claim 1 wherein the power-line carrier transmitter means comprises a multi-channel carrier current interface with the plurality of power-line carrier devices.

3. The intelligence system of claim 2 wherein the multi-channel capacity is at least 256 channels.

4. The intelligence system of claim 1 and a party line network protocol over two wires connected through the interface means to the dedicated computer means.

5. The intelligence system of claim 4 wherein the personal computer is connected to the party line network.

6. The intelligence system of claim 1 wherein the output board means comprises a multi-terminal strip, a plurality of relays and peripheral bus interface circuitry.

7. The intellignece system of claim 1 wherein some of the resisters are predefined and others of the registers are user-defined.

8. The intelligence system of claim 1 wherein the dedicated computer means comprises a plurality of network means to tie all of the said devices together into a complete control strategy.

9. The intelligence system of claim 8 wherein the networks means comprise networks, at least some of the networks containing a user program to perform at least one function.

10. The intelligence system of claim 9 wherein the network means comprises means to individually turn on and off each network from commands from another network and means to individually turn on and off each network from the personal computer.

11. The intelligence system of claim 1 and a real time clock means to determine time of day, day of week, day of year and year relationships.

* * * * *